United States Patent [19]

Goel

[11] Patent Number: 4,728,737

[45] Date of Patent: Mar. 1, 1988

[54] HIGH PERFORMANCE TWO-COMPONENT EPOXY STRUCTURAL ADHESIVE WITH CHEMICAL THIXOTROPY

[75] Inventor: Anil B. Goel, Worthington, Ohio

[73] Assignee: Ashland Oil, Inc., Ashland, Ky.

[21] Appl. No.: 819,963

[22] Filed: Jan. 21, 1986

Related U.S. Application Data

[63] Continuation of Ser. No. 730,142, May 3, 1985, Pat. No. 4,578,424.

[51] Int. Cl.$^4$ .......................................... C07D 295/04
[52] U.S. Cl. ..................................... 544/400; 544/386
[58] Field of Search ................................ 544/400, 386

[56] References Cited

U.S. PATENT DOCUMENTS

| | | | |
|---|---|---|---|
| 2,826,578 | 3/1958 | Perron | 544/400 |
| 3,190,922 | 6/1965 | Le Bard | 544/404 |
| 3,331,888 | 7/1967 | Cantatore | 544/400 |
| 3,385,858 | 5/1968 | Katz | 544/400 |
| 3,420,794 | 1/1969 | May et al. | 528/93 |
| 3,632,511 | 1/1972 | Liao | 544/386 |
| 3,812,003 | 5/1974 | Larson | 428/480 |
| 3,935,051 | 1/1976 | Bender et al. | 528/53 |

OTHER PUBLICATIONS

May et al., CA 70-58590d.
General Mills Inc., CA 66-19061e.
Le Bard et al., CA 63-9966.

*Primary Examiner*—Donald G. Daus
*Assistant Examiner*—Cecilia Shen
*Attorney, Agent, or Firm*—John F. Jones

[57] ABSTRACT

A two component adhesive formulation comprising a mixture of A. an epoxy component comprising an epoxy resin and an additive selected from the group consisting of (a) a polyisocyanate, (b) a carboxylic anhydride and (c) a compound having unsaturated carbon-carbon bonds capable of undergoing Michael addition reaction with amines, and B. a hardner component for curing component A comprising a mixture of amido amines, primary and secondary amines having tertiary amine groups or ether groups in their backbone, and bisphenol-A is described.

3 Claims, No Drawings

HIGH PERFORMANCE TWO-COMPONENT EPOXY STRUCTURAL ADHESIVE WITH CHEMICAL THIXOTROPY

This is a continuation of copending U.S. patent applicaton Ser. No. 730,142, filed 05/03/85, now U.S. Pat. No. 4,578,424.

This invention relates to two-component structural adhesives or sealant compositions based on a mixed epoxy resin component and a mixed amide amine hardner component and more particularly pertains to two component adhesive formulations both components of which can be used by gravity feed but mixtures of which result in rapid thixotropy buildup for sag resistance.

Two component adhesive systems have been described in the patent literature, as represented particularly by U.S. Pat. Nos. 3,812,003 and 3,935,051, as well as being available commercially for some time. In general, these adhesives comprise a prepolymer component and a curative component which are generally mixed in ratios of about 4:1 or higher to give essentially a highly fluid mix unless the mix is highly loaded with filler. Typically, the prepolymer component is the reaction product of an organic polyisocyanate with a reactive hydrogen containing material containing mostly two hydroxyls and having a molecular weight of 500 to about 5000 or higher, preferably selected from the polyester polyols and the polyether polyols. The curative component preferably is a low molecular weight polyfunctional polyol preferably having three or more hydroxyls of relatively low equivalent weight. Also, these adhesives generally contain sufficient urethane catalyst to give the desired gel time to permit the adhesive to be applied at least to the substrate before the adhesive gels.

Since these adhesives without filler inherently have low sag resistance, those of ordinary skill in this art have incorporated fillers to develop or increase the sag resistance where said resistance is needed. Unfortunately, this technique also increases the viscosity of the component or components containing the filler and makes it more difficult to mix the components and then spread the adhesive on a substrate. Hence, loading with high levels of filler needed to achieve sag resistance results in difficulties in getting satisfactory mixing because high pressure mixing or high shear equipment and high pressure pumping equipment is needed. Further, high loading in many cases tends to lower the strength of the adhesive bond and, therefore, is undesirable from that standpoint.

A variety of active hydrogen compounds (polyamines, polyacids, polymercaptans, polyphenols, etc.) have been used as the curing agents for epoxide resins to give thermosetting polymers which have been used in adhesive and sealant applications. Although two component adhesive compositions based on epoxide resins have been used heretofore, these systems lack the property of thixotrophy which prevents or minimizes sagging of the adhesive before the complete curing (setting) of the adhesive bond. Sagging is a problem encountered, paticularly on surfaces which are other than horizontal in nature. Furthermore, two component adhesive formulations based on epoxy resin/amine hardner of the prior art are known to give brittle cured polymers. Inclusion of fillers such as fumed silica as thixotroping agents results in the loss of mobility of the individual epoxy resin and amine hardner components prior to their mixing, thus, not permitting the gravity feed which is provided in the present invention. Prior to the present invention no two component epoxy adhesive composition has been described which has good flow properties prior to mixing and is capable of building thixotropy upon mixing of the components.

The existing two component adhesives based on epoxy resins and amine hardners do not consist of chemical thixotropy nor do they possess long open time after mixing or fast curing rates at low temperatures. The adhesive compositions of this invention exhibit excellent adhesive performance in addition to desirable properties such as low viscosity of both components with good flow properties, foolproof (variable) mix ratios of the components, chemical thixotropy upon mixing, long room temperature open time, rapid cure at temperatures on the order of about 100 degrees C., high flexibility and toughness after cure, low hygroscopicity, and excellent adhesive performance in bonding virtually any types of substrates including sheet molding compounds (SMC), cold rolled steel (CRS), and others.

It is an object of this invention to provide a two component adhesive formulation composed of an epoxy resin component and a hardner component the individual components of which have relatively low viscosities (generally less than 200,000 cps) enabling them to be used by gravity feed methods.

Another object is to provide two component adhesive formulations which have non-critical mix ratios for virtually foolproof mixing in which there can be as much as 50% variation in the ratio of components without adverse effects on the application of the ultimate adhesive mixture.

Another object of this invention is to provide a two component adhesive formulation which becomes thixotropic after mixing of the components before gellation occurs to avoid sagging in the adhesive application.

Still another object is to provide a two component adhesive formulation which has reasonably long room temperature open time or shelf life after the components have been mixed.

Another object is to provide an adhesive formulation which cures rapidly upon heating to a temperature in the range of about 100 degrees C.

Another object of this invention is to provide an adhesive formulation which can be used on most substrates without rigorous surface preparation (cleaning, scratching, scrubbing, priming, etc.) to give a highly flexible, tough adhesive bond with high shear and peel strengths and which has low hygroscopicity.

I have developed a two component adhesive system comprising an epoxy resin component and a hardner component which meets all of the above-described desired requirements. Liquid diglycidyl ethers of Bisphenol-A of different epoxy equivalent weights (180 to 200) have preferably been used as the major part of the epoxy resin formulations. In order to improve the flexibility and the toughness of the adhesive bond, inclusion of a rubber segment in the epoxy resin component has been considered. For this purpose, the epoxy resin in a typical formulation was allowed to react with from about 5 to 20% by weight of carboxylic acid group terminated butadiene/acrylonitrile copolymer rubber. The three types of additives such as (a) aliphatic di- or polyisocyanate (e.g., m-tetra-methyl xylyl diisocyanate), (b) carboxylic anhydride of low reactivity (e.g., isobutylene-maleic anhydride copolymer oligomer), (c) molecules with unsaturated carbon-carbon bonds capable of undergoing Michael addition reaction with amines (e.g., maleic or fumeric groups) can be used in the epoxy resins as the reactive components towards hardners providing chemical thixotropy by undergoing rapid reactions with amine hardners. In this respect, I have found that the addition of maleic anhydride to the epoxy resin component resulted in initial lowering of the viscosity of the epoxy resin and with a low level (about 2% by weight or less) of maleic anhydride, the epoxy resin component had shelf life of greater than two months. In this case the reaction of anhydride groups of the epoxy component with amines of the hardner component when the two components are mixed is believed to give the rapid initial thixotropy to the adhesive system.

Similarly, the epoxy resin components containing an aliphatic isocyanate such as meta tetramethylene xylene diisocyanate upon mixing with the amine hardner component, results in a rapid initial reaction to provide thixotropy to the system. The amounts of these additivies in the epoxy resin component required for thixotropy may vary from about 0.5 to 10% by weight. The exact amounts used depend upon the initial viscosity of the epoxy resin component. Optionally, low viscosity mono- and polyepoxy materials such as phenyl glycidyl ether, butane diol diglycidyl ether, etc. may be included in the epoxy resin component to reduce the overall viscosity of the final formulation.

The hardner components used for curing the above-described epoxy resin components can be formulated containing mixtures of amido amines, primary and secondary amines with tertiary amine groups or alkylene ether groups in the backbone and Bisphenol-A. In order to obtain the high flexibility, toughness and improved water stability, the amido amines used contained flexible groups and particularly, the dimerized linoleic acid backbone. These materials may be obtained from commercial sources, e.g., Versamide 140 (which is a polyamidoamine of dimerized linoleic acid). In order to improve the curing rate, I prefer to use either the amido amine containing tertiary amine group or the amido amine combined with amines such as 2-amino-ethyl piperazine. The tertiary amine containing amido amine was prepared by the amidation reaction of dimerized linoleic acid with either 2-amino-ethyl piperazine or bis-(amino propyl) piperazine. Furthermore, in order to improve the rates of curing and the flexibility and the toughness, polyphenolics such as Bisphenol-A can also be included in the hardner compositions. The active-hydrogen equivalent weight of the hardner component can be varied by adding different levels of poly(alkylene ether) diamine. This also helps to improve the flexibility and the adhesion properties of the final adhesive formulation. The weight ratios of amido amine: amine: Bisphenol-A in the hardner component may be in the range of 30-90: 8-35: 2-35.

The commonly known fillers such as Talc, Kaophile (alumina), metal oxides, metals, carbon, etc., can be used in either the epoxy resin component or the hardner component or both and the overall amounts may range from 0.1 to 40% by weight of filler based on the total weight of the adhesive formulation.

The polyepoxides useful in the epoxy resin component of this invention can be monomeric or polymeric, saturated or unsaturated, aliphatic, cycloaliphatic, aromatic or heterocyclic, and they may be substituted if desired with other substituents besides the epoxy group, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula

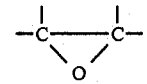

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxy groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate, or the dimethyl ester of 6,7,10,11-diepoxyhexadecane-1,16-dicarboxylic acid. Furthermore, there may be mentioned epoxidized mono-, di-, or polyesters, mono-, di- or polyacetals containing at least one cycloaliphatic 5-membered ring, to which at least two 1,2-epoxidized groups are linked. A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

Although aliphatic polyisocyanates are preferred in this invention aromatic polyisocyanates may also be used advantageously.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1, 2-diisocyanate, 2,3-dimethyl tetramethylene diisocyanate, butylene-1,2-diisocyanate, butylene-1, 3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene 1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

I have discovered a two component adhesive formulation the components of which are an epoxide component (Ep) and an amine hardner component (Ha). To illustrate the general procedure used in the practice of this invention, the two components (Ep) and (Ha) were mixed in appropriate weight amounts under an inert atmosphere (i.e., nitrogen) at room temperature and the mixture was applied in the form of a ⅜ inch bead across the substrate (i.e., sheet molding compound laminate) that was in sheet form measuring 12 inches by 4 inches by 100 mils (thickness) and the surface of which was first wiped with acetone. After sprinkling a few 30 mils diameter glass beads on the top of the adhesive applied to one surface of the sheet the other laminate sheet was placed on the top of the adhesive and glass beads with a one-inch overlap between substrate sheets. The thus prepared samples were kept at room temperature under contact pressure until the adhesive had gelled, and then they were placed in an oven maintained at 250 degrees F. for post curing for 30 minutes. Test specimens were cut from these cured samples into one-inch strips. In this manner, several test samples were prepared from each adhesive sample for physical testing. In a similar manner the adhesive formulation was tested on primed (urethane primer) cold rolled steel, one inch wide, strips.

To illustrate this invention, an epoxy resin component (Ep) was prepared from a mixture of 60 g of the diglycidyl ether of Bisphenol-A, 67. g of a carboxylic acid terminated acrylonitrile/butadiene copolymer containing 18% by weight of acrylonitrile, 3.3 g of phenyl glycidyl ether, 1.7 g of tetramethyl xylene diisocyanate and 28.3 g of a talc filler. A hardner component (Ha) was prepared from a mixture of dimerized linoleic acid/bis-aminopropyl piperazine (1:2 mole ratio) (28.6 g), 9.5 g of amino ethyl piperazine, 19 g of amine (poly (alkylene ether) diamine, molecular weight 400), 9.5 g of Bisphenol-A and 33.4 g of talc filler. After preparation the component Ep was found to have a viscosity of 100,000 cps and component Ha was found to have a viscosity of 59,000 cps. The two components which had gravity flow viscosities, upon mixing in weight ratios of 1:1 and 1.5:1 showed immediate thickening (thixotropy and not gellation). The open time at room temperature prior to gellation of the mixtures was approximately 30 minutes and gel time at 100 degrees C. (air convection oven) was less than 5 minutes. The adhesive bonds prepared using these two mixtures on substrates such as SMC or cold rolled steel plates showed excellent peel and shear strength as well as side impact strength. On SMC 100% substrate failure resulted under various test conditions in the range of 300 to 500 psi; whereas, in primed cold rolled steel plates, primer failure occurred at 2000 to 3500 psi.

This invention is further illustrated in the following representative examples.

TEST PROCEDURE

In the examples the following tests were carried out by using in each case a set of at least three samples for each type of test.

A. Shear strength test was conducted at room temperature after ½ hour post curing the sample at 250 degrees F.

B. Post baking at 425 degrees F. of the sample for an additional ½ hour and shear strength tested at room temperature.

C. Shear strength test at 180 degrees F. after 30 minutes curing at 250 degrees F.

D. Shear strength test at room temperature on 250 degrees F. post cure samples after they had been immersed for 24 hours in water held at 203 degrees F.

EXAMPLE 1

Liquid diglycidyl ether of Bisphenol-A (epoxy equivalent weight of about 180-195) (900 g), a carboxyl terminated butadiene/acrylonitrile copolymer (containing 18% by weight acrylonitrile) (100 g) and 2.5 g of triphenyl phosphine (catalyst) were mixed and heated at 120 degrees C. for about one hour under constant stirring. The viscous liquid which resulted had a room temperature viscosity of about 20,000 cps and was used for modified epoxy resin formulations.

EXAMPLE 2

Several solutions of liquid diglycidy ether of Bisphenol-A (DGEBPA) with varying amounts of added maleic anhydride were prepared by rapidly dissolving maleic anhydride in DGEBPA at a temperature in the range of 40-60 degrees C. These solutions (labelled compositions No. 1-5 in Table 1) were brought back to room temperature and their viscosities were checked the following day at room temperature. Viscosity lowering was observed when maleic anhydride was added to the mixture. The compositions and the viscosities are given in Table 1. Shelf life tests for the mixtures given in Table 1 showed that gelation occurred after about one month at room temperature in the compositions in which the maleic anhydride content was above about 5% whereas the compositions containing maleic anhydride at the 2% level stayed liquid for more than 2 months at room temperature.

TABLE 1

| Composition No. | DEGBA Wt. % | Maleic Anhydride Wt. % W | Viscosity cps |
|---|---|---|---|
| 1 | 100 | 0 | 12,000 |
| 2 | 98 | 2 | 8,000 |
| 3 | 06 | 4 | 6,500 |
| 4 | 84 | 6 | 5,200 |
| 5 | 90 | 10 | 4,000 |

EXAMPLE 3

A. Poly(propylene oxide) diol (hydroxyl equivalent weight 205) (615.4 g) was mixed with 294 g of maleic anhydride and 0.94 g of p-tolyl sulfonic acid. The mixture was stirred at 100 degrees C. under nitrogen for five hours. To 58.4 g of the above material was added 188 g of liquid DGEBPA and 0.5 g of triphenyl phosphine. The mixture was then heated at 110-120 degrees C. for one hour to give an epoxy resin with an approximate epoxy equivalent weight of 308.

B. The procedure of Example 3A was followed using 294 g of maleic anhydride, 135.2 g of butanediol and 2.0 g of p-tolylsulfonic acid to prepare the carboxylic terminated product. A portion of this (34.85 g) was mixed with 416.3 g of liquid DGEBPA and 1.35 g of triphenyl phosphine. The resulting mixture was heated at 120 degrees C. for one hour to give the epoxy resin with epoxy equivalent weight of 226.

EXAMPLE 4

An epoxy resin filled with talc filler was prepared using 66.7 parts by weight of the epoxy resin of Example 1, 32.3 parts of phenyl glycidyl ether, 1.7 parts of an aliphatic diisocyanate (tetramethyl xylyl diisocyanate) and 28.3 parts of talc filler. This filled resin had a viscosity of about 80,000 cps and had gravity flow properties.

EXAMPLE 5

Epoxy resin filled with Kaophile-2 (alumina) filler was prepared using 69 parts by weight of the epoxy resin of Example 2, 2% by weight of maleic anhydride, 2.6 parts of butanediol diglycidyl ether and 28.4 parts of Kaophile-2 filler. This resin, with gravity flow properties, had a viscosity of 90,000 cps.

EXAMPLE 6

An epoxy resin filled with talc filler was prepared using 65.2 parts by weight of the epoxy resin of Example 3B, 5.3 parts of butanediol diglycidyl ether and 29.5 parts of talc. This epoxy resin had gravity flow properties and a viscosity of 150,000 cps.

EXAMPLE 7

Poly(alkylene ether)diamine (molecular weight of 400) (400 g) and Bisphenol-A (200 g) were mixed and heated at about 80 degrees C. for one hour to give a clear viscous solution. This mixture was used to obtain the hardner compositions as described in later Examples.

EXAMPLE 8

A solution of poly (alkylene ether) diamine, 2-amino ethyl piperazine and Bisphenol-A in 1:1:1 weight ratio was prepared by following the procedure of Example 7.

EXAMPLE 9

Dimerized linoleic acid (400 g) and 2-amino ethyl piperazine (185.8 g) were mixed in a three-neck flask equipped with mechanical stirrer, thermometer with temperature controller, Dean Stark type collector with condenser and nitrogen inlet. The mixture was heated at 180 degrees C. for three to four hours and water produced in the reaction was distilled off. The residue was evacuated under reduced pressure (25 mm of Hg) for 30 minutes and the mixture was brought back to room temperature under nitrogen. The resulting viscous liquid was analyzed for acid value which was found to be about 1 and total amine value which was found to be about 138.

EXAMPLE 10

Dimer acid based amido-amine resin was prepared following the procedure of Example 9, using 350 g of dimerized linoleic acid and 252.3 g of bis-amino propyl piperazine. The viscous liquid had an acid value of about 1 and a total amine value of about 366.

EXAMPLE 11

Poly (aminoalkylene)amide with imidazoline (active hydrogen equivalent weight of about 90) (75 g) was mixed with 25 g of Bisphenol-A and the mixture was heated at about 60 degrees C. for one hour to give a viscous liquid. This was filled with 50 g of talc filler to give a viscous paste.

EXAMPLE 12

The hardner was prepared by mixing 49 parts by weight of poly (aminoalkylene) amide with imidazoline groups, 4.7 parts of amino ethyl piperazine, 16.3 parts of Bisphenol-A and 30 parts of talc filler. The hardner had gravity flow with viscosity of about 96,000 cps.

EXAMPLE 13

The hardner was prepared by mixing 28.6 parts by weight of amido-amine resin of Example 10, 10 parts of poly(alkylene ether)diamine (molecular weight 400), 28 parts of the mixture of Example 8 and 33.4 parts of Kaophile-2. The viscosity of this hardner was about 59,000 cps.

EXAMPLE 15

The room temperature open time and 100 degrees C. air convection oven cure time study on various combinations of epoxy resins and hardners were carried out by mixing them in weight ratios varying from 1:1 to 1.5:1. The total sample weight ranged between 10–15 g. The results are given in Table 2.

TABLE 2

| Composition Number | Components* | Wt. Ratio | Open Time Min. at Room Temp. | 100° C. Cure Time (Min.) |
|---|---|---|---|---|
| 1 | Ep1/Ha1 | 1:1 | 30 | 5 |
| 2 | Ep1/Ha1 | 1:1.5 | 26 | 4 |
| 3 | Ep1/Ha2 | 1:1 | 35 | 5.5 |
| 4 | Ep1/Ha2 | 1:1.5 | 30 | 4.5 |
| 5 | Ep1/Ha3 | 1:1.5 | 40 | 6.5 |
| 6 | Ep2/Ha1 | 2:1 | 35 | 5.5 |
| 7 | Ep2/Ha1 | 1:1.5 | 28 | 5 |
| 8 | Ep2/Ha2 | 1:1.2 | 30 | 5 |
| 9 | Ep3/Ha1 | 1:1.3 | 32 | 5.5 |
| 10 | Ep3/Ha2 | 1:1.2 | 34 | 5.5 |

*EP1 is the epoxy resin of Example 4
Ep2 is the epoxy resin of Example 5
Ep3 is the epoxy resin of Example 6
Ha1 is the hardner of Example 13
Ha2 is the hardner of Example 14
Ha3 is the Hardner of Example 12

EXAMPLE 16

The epoxy resin of Example 4 and the hardner of Example 13 were mixed in appropriate weight ratios to obtain the adhesive mixture which was tested on sheet molding compound sheets and on primed cold rolled steel panels. Upon mixing, a rapid viscosity buildup (thixotropy) was observed. The adhesive bonds were cured at about 95 degrees C. in heated panel for 2–5 minutes and the green strength buildup was determined by cross-peel test. A rapid green strength buildup was noticed giving greater than 100 psi strength within 2 minutes and in about 3 minutes, substrate failure in the SMC tests was observed. The test results are given in Table 3.

TABLE 3

| Sample Number | Test Procedure | Shear Strength, psi 1:1 | 1:1.5 |
|---|---|---|---|
| Substrate - SMC | | | |
| 1 | A | 410(DL)* | 525(DL)* |
| 2 | A | 450(DL) | 350(DL) |
| 3 | A | 480(DL) | 510(SB) |
| 4 | B | 505(DL) | 425(DL) |
| 5 | B | 470(SB) | 450(DL) |
| 6 | D | 530(SB) | 460(DL) |
| 7 | D | 480(SB) | 395(DL) |
| 8 | C | 310(AF) | 425(SB) |
| 9 | C | 210(SB) | 550(SB) |
| Substrate - Cold Rolled Steel, Primed | | | |
| 10 | A | 3000(PF) | 2480(PF) |

TABLE 3-continued

| Sample Number | Test Procedure | Shear Strength, psi 1:1 | 1:1.5 |
|---|---|---|---|
| 11 | A | 2050(PF) | 2350(PF) |

*PF - Primer Failure
SB - Substrate Broke
AF - Adhesive Failure
DL - Substrate Delaminated

EXAMPLE 17

The epoxy resin of Example 5 and the hardner of Example 13 were mixed in 1:1 and 1.5:1 ratios, and adhesive testings were carried out under various conditions. The test results are given in Table 4

TABLE 4

| Sample Number | Test Procedure | Shear Strength, psi 1:1 | 1:1.5 |
|---|---|---|---|
| | | Substrate SMC | |
| 1 | A | 465(SB) | 435(DL) |
| 2 | A | 510(DL) | 425(DL) |
| 3 | A | 470(SB) | 465(DL) |
| 4 | B | 340(SB) | 496(DL) |
| 5 | B | 465(DL) | 355(SB) |
| 6 | D | 285(SB) | 405(DL) |
| 7 | D | 330(SB) | 445(DL) |
| 8 | C | 190(SB) | 435(DL) |
| 9 | C | 225(SB) | 625(DL) |
| | | Substrate Cold Rolled Steel, Primed | |
| 10 | A | 3090(PF) | 3185(PF) |
| 11 | A | 2980(PF) | 3170(PF) |

EXAMPLE 18

The epoxy resin of Example 5 and the hardner of Example 14 were mixed in appropriate weight ratio. An initial viscosity buildup was observed. The adhesive remained ungelled for about 30 minutes. The adhesive was used in tests and the results are given in Table 5.

TABLE 5

| Sample Number | Test Procedure | Lap Shear Strength, psi 1.1 | 1:1.5 |
|---|---|---|---|
| | | Substrate - SMC | |
| 1 | A | 420(SB) | 455(DL) |
| 2 | A | 325(SB) | 475(DL) |
| 3 | A | 460(SB) | 455(DL) |
| 4 | B | 415(SB) | 520(DL) |
| 5 | B | 330(SB) | 480(DL) |
| 6 | D | 370(SB) | 195(SB) |
| 7 | D | 475(DL,AF) | 200(SB) |
| 8 | 180° F. | 230(SB) | 265(SB) |
| 9 | 180° F. | 240(SB) | 260(SB) |
| | Substrate Cold Rolled Steel, Primed | | |
| 10 | A | 2850(PF) | 2890(PF) |
| 11 | A | 3070(PF) | 2800(PF) |
| 12 | D | 2450(PF) | 2580(PF) |
| 13 | D | 2210(PF) | 2670(PF) |

EXAMPLE 19

The epoxy resin of Example 6 and hardner of Example 12 were mixed in 1.5:1 weight ratio. Initial increase in the viscosity was observed. The resulting adhesive was applied on test panels of SMC and cold rolled steel. The test results on SMC indicated substrate failure in the shear strength range of 300-500 psi under all the test conditions (A through 19), while on the steel panels is shown 2322-3000 psi shear strengths.

I claim:

1. A tertiary amine containing amide amine composition resulting from the amidification of substantially one mole of dimerized linoleic acid with substantially two moles of a member selected from the group consisting of 2-amino-ethyl piperazine and bis-(amino propyl) piperazine.

2. The composition of claim 1 resulting from the amidification of dimerized linoleic acid with 2-amino-ethyl piperazine.

3. The composition of claim 1 resulting from the amidification of dimerized linoleic acid with bis-(amino propyl) piperazine.

* * * * *